United States Patent
Gu (10) Patent No.: US 9,230,347 B2
(45) Date of Patent: Jan. 5, 2016

(54) TRANSPARENCY-BASED IMAGE PROCESSING METHOD, DEVICE, AND TERMINAL

(75) Inventor: Wei Gu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 199 days.

(21) Appl. No.: 14/342,620

(22) PCT Filed: Dec. 14, 2011

(86) PCT No.: PCT/CN2011/084001
§ 371 (c)(1),
(2), (4) Date: Mar. 4, 2014

(87) PCT Pub. No.: WO2012/151995
PCT Pub. Date: Nov. 15, 2012

(65) Prior Publication Data
US 2014/0198124 A1 Jul. 17, 2014

(30) Foreign Application Priority Data
Sep. 5, 2011 (CN) .......................... 2011 1 0261006

(51) Int. Cl.
*G09G 5/02* (2006.01)
*G06T 11/00* (2006.01)
*G06T 15/50* (2011.01)
*G06T 15/00* (2011.01)

(52) U.S. Cl.
CPC ............. *G06T 11/001* (2013.01); *G06T 15/005* (2013.01); *G06T 15/503* (2013.01)

(58) Field of Classification Search
None
See application file for complete search history.

(56) References Cited

U.S. PATENT DOCUMENTS 6,377,269 B1 * 4/2002 Kay .................. G06T 7/0081
345/589
7,312,801 B2 12/2007 Stollnitz
(Continued)

FOREIGN PATENT DOCUMENTS

CN 1397915 A 2/2003
CN 2553453 Y 5/2003
(Continued)

OTHER PUBLICATIONS

Alpha blending without SIMD support, vistualdub org, 2 total pages, Jul. 8, 2006.
(Continued)

*Primary Examiner* — Ming Hon
*Assistant Examiner* — Khoa Vu
(74) *Attorney, Agent, or Firm* — Oppedahl Patent Law Firm LLC (57) ABSTRACT

The present disclosure discloses a transparency-based image processing method, device, and terminal. The method includes steps of: acquiring first simulated pixel information representing a first pixel, and acquiring first transparency information; acquiring second simulated pixel information representing a second pixel, and acquiring second transparency information; calculating third simulated pixel information representing a third pixel as a sum of a product of the first simulated pixel information times the first transparency information and a product of the second simulated pixel information times the second transparency information; and acquiring a third actual pixel by narrowing the third simulated pixel information. Compared with an existing fixed-point-number method, the present disclosure reduces prior six integer multiplications and three integer additions to two integer multiplications and one integer addition, such that efficiency in operating the method may be enhanced; compared with an existing method by looking up a table, the transparency-based image processing method provided by the present disclosure does not require traversing any 2D-array table or occupying more memory.

9 Claims, 3 Drawing Sheets

(56) References Cited

U.S. PATENT DOCUMENTS

| | | |
|---|---|---|
| 2006/0192788 A1 | 8/2006 | Stollnitz |
| 2011/0267363 A1 | 11/2011 | Miller |
| 2011/0304642 A1 | 12/2011 | Coupe |
| 2013/0120433 A1* | 5/2013 | Diverdi ................ G06T 11/001 345/593 |

FOREIGN PATENT DOCUMENTS

| | | |
|---|---|---|
| CN | 1825353 A | 8/2006 |
| CN | 101308581 A | 11/2008 |
| CN | 101668144 A | 3/2010 |
| WO | 2010078954 A1 | 7/2010 |

OTHER PUBLICATIONS

Intel, Intel Integrated Performance Primitives for Intel Architecture Reference Manual vol. 2 Image and Video Processing, 2 total pages, Jan. 31, 2007.

Supplementary European Search Report in European application No. 11865341.9, mailed on May 20, 2014.

English Translation of the Written Opinion of the International Search Authority in international application No. PCT/CN2011/084001, mailed on Jun. 14, 2012.

International Search Report in international application No. PCT/CN2011/084001, mailed on Jun. 14, 2012.

\* cited by examiner

| r | r | r | r | r | r | r | r | r | g | g | g | g | g | g | g | g | g | g | b | b | b | b | b | b | b | b | b |

+

| r | r | r | r | r | r | r | r | r | g | g | g | g | g | g | g | g | g | g | b | b | b | b | b | b | b | b | b |

=

| r1 | r1 | r1 | r1 | r1 | r1 | r1 | r1 | r1 | g1 | g1 | g1 | g1 | g1 | g1 | g1 | g1 | g1 | g1 | b1 | b1 | b1 | b1 | b1 | b1 | b1 | b1 | b1 |

Fig.6

| r1 | r1 | r1 | r1 | r1 | r1 | r1 | r1 | r1 | g1 | g1 | g1 | g1 | g1 | g1 | g1 | g1 | g1 | g1 | b1 | b1 | b1 | b1 | b1 | b1 | b1 | b1 | b1 |

| R1 | R1 | R1 | R1 | R1 | G1 | G1 | G1 | G1 | G1 | G1 | B1 | B1 | B1 | B1 | B1 |

TRANSPARENCY-BASED IMAGE PROCESSING METHOD, DEVICE, AND TERMINAL

TECHNICAL FIELD

The present disclosure relates to the field of computer graphics, and in particular to a transparency-based image processing method, device, and terminal.

BACKGROUND

With an alpha color mixing method presently applied widely in the field of computer graphics, any imaginable translucent effect, such as dazzling effect of fire, smoke, a shadow, a dynamic light source, and the like, may be implemented.

The alpha color mixing method in image processing serves to implement a sort of translucent effect. Given a pixel A of an opaque object and a pixel B of another transparent object, when pixel A is viewed through pixel B, a pixel C observed by an observer is a pixel resulted from a mixture of pixel B and pixel A. For example, a mixture of 30% of pixel B and 70% of pixel A gives a translucent pixel C of 100%, wherein a pixel (also known as a picture element) is a fundamental unit in image displaying.

Steps of implementing a traditional alpha color mixing method are as follows.

Step 1: pixel A is decomposed into RGB color components denoted by R(A), G(A), and B(A).

Step 2: pixel B is decomposed into RGB color components denoted by R(B), G(B), and B(B).

Step 3: a transparency alpha of pixel B is acquired (wherein the alpha falls in the range of a floating-point number [0.0, 1.0], wherein a pixel is completely transparent with alpha=0.0, and a pixel is completely opaque with alpha=1.0).

Step 4: as the sum of the transparencies of pixel A and pixel B is the maximal value of a transparency, the acquired transparency of pixel A is 1.0-alpha.

Step 5: a mixed pixel C is formed by a mixture of pixel B and pixel A, and RGB color components of the mixed pixel C, denoted by R(C), G(C), and B(C), are calculated respectively.

RGB color component R(C) of the mixed pixel C equals the sum of the product of color component R(B) of pixel B times the transparency alpha, and the product of color component R(A) of pixel A times the transparency 1.0-alpha.

RGB color component G(C) of the mixed pixel C equals the sum of the product of color component G(B) of pixel B times the transparency alpha, and the product of color component G(A) of pixel A times the transparency 1.0-alpha.

RGB color components B(C) of the mixed pixel C equals the sum of the product of color component B(B) of pixel B times the transparency alpha, and the product of color component B(A) of pixel A times the transparency 1.0-alpha.

Step 6: color components R(C), G(C), and B(C) of the mixed pixel C are synthesized into the final mixed pixel C.

Adopting of the alpha color mixing method has a major impact on screen-refreshing performance, as each time a screen is refreshed, each pixel on the screen has to be calculated using the method. For example, a currently common wide-screen display of a computer generally has a resolution of 1440*900 (i.e., 1296000) pixels, and therefore with the alpha color mixing method, a number of 1296000 calculations have to be performed each time the screen is refreshed.

For example, Chinese patent application with publication No. CN1825353, titled MIXING MODE FOR HARDWARE ACCELERATION, discloses a solution for mixing colors of a source graphic-element and a target graphic-element using a graphic processing unit, wherein the graphic processing unit receives from a central processing unit or a graphic application a mixing program for mixing said graphic-elements and executes the mixing program. For example, the graphic processing unit draws the source graphic-element in a source texture map, and draws the target graphic-element in a target texture map. The mixing program (for example, a pixel shader) is configured to be applied to said graphic-elements, and the graphic processing unit applies a mixing mode to each pixel of said graphic-elements so as to present a synthetic graphic-element in a target to be presented.

This solution is disadvantageous as it uses the aforementioned traditional alpha color mixing method, wherein each pixel to be mixed is first decomposed into RGB color components respectively; then mixing calculation is performed on each color component; finally mixed RGB color components are synthesized into a final mixed pixel, such that with the method, massive calculations have to be performed, leading to low efficiency.

In view of this, at present technical solutions as follow are also adopted to achieve the goal of alpha color mixing.

With technical solution 1, a fixed-point-number method is adopted.

With the prior alpha color mixing method, the alpha of a floating-point number is used. However, calculation with fixed-point numbers is normally much faster than calculation with floating-point numbers. For example, the 8-bit fixed-point number of a floating-point number 1.0 is 255, so the traditional alpha color mixing method may be improved to be implemented with the following steps.

Step 1: pixel A is decomposed into RGB color components denoted by R(A), G(A), and B(A).

Step 2: pixel B is decomposed into RGB color components denoted by R(B), G(B), and B(B).

Step 3: a transparency alpha of pixel B is acquired (wherein the alpha falls in the range of a fixed-point number [0, 255], wherein a pixel is completely transparent with alpha=0, and a pixel is completely opaque with alpha=255).

Step 4: as the sum of the transparencies of pixel A and pixel B is the maximal value of a transparency, the acquired transparency of pixel A is 255-alpha.

Step 5: a mixed pixel C is formed by a mixture of pixel B and pixel A, and RGB color components of the mixed pixel C, denoted by R(C), G(C), and B(C), are calculated respectively.

RGB color component R(C) of the mixed pixel C equals the sum of the product of color component R(B) of pixel B times the transparency alpha, and the product of color component R(A) of pixel A times the transparency 255-alpha.

RGB color component G(C) of the mixed pixel C equals the sum of the product of color component G(B) of pixel B times the transparency alpha, and the product of color component G(A) of pixel A times the transparency 255-alpha.

RGB color components B(C) of the mixed pixel C equals the sum of the product of color component B(B) of pixel B times the transparency alpha, and the product of color component B(A) of pixel A times the transparency 255-alpha.

Step 6: RGB color components R(C), G(C), and B(C) of the mixed pixel C are divided exactly by 255 respectively, and are then synthesized into the final mixed pixel C.

For aforementioned technical solution 1, as exact division is a relatively slow calculation, modification may be made to the aforementioned flow, for example by replacing exact division with bit-shifting commonly adopted at present.

In the aforementioned technical solution 1, levels of the transparency alpha fall in the range of [0, 255], which may be narrowed to [0, 32] as it is often unnecessary to use such refined levels of the transparency alpha as [0, 255] in a practical application. As moving to the right by 5 bits is equivalent to exact division by 32, aforementioned technical solution 1 may be improved as follows.

Step 1: pixel A is decomposed into RGB color components denoted by R(A), G(A), and B(A).

Step 2: pixel B is decomposed into RGB color components denoted by R(B), G(B), and B(B).

Step 3: a transparency alpha of pixel B is acquired (wherein the alpha falls in the range of a fixed-point number [0, 32], wherein a pixel is completely transparent with alpha=0, and a pixel is completely opaque with alpha=32).

Step 4: as the sum of the transparencies of pixel A and pixel B is the maximal value of a transparency, the acquired transparency of pixel A is 32-alpha.

Step 5: a mixed pixel C is formed by a mixture of pixel B and pixel A, and RGB color components of the mixed pixel C, denoted by R(C), G(C), and B(C), are calculated respectively.

RGB color component R(C) of the mixed pixel C equals the sum of the product of color component R(B) of pixel B times the transparency alpha, and the product of color component R(A) of pixel A times the transparency 32-alpha.

RGB color component G(C) of the mixed pixel C equals the sum of the product of color component G(B) of pixel B times the transparency alpha, and the product of color component G(A) of pixel A times the transparency 32-alpha.

RGB color components B(C) of the mixed pixel C equals the sum of the product of color component B(B) of pixel B times the transparency alpha, and the product of color component B(A) of pixel A times the transparency 32-alpha.

Step 6: RGB color components R(C), G(C), and B(C) of the mixed pixel C are moved to the right by 5 bits respectively, and are then synthesized into the final mixed pixel C.

With technical solution 2, a method by looking up a table is adopted.

the method by looking up a table is an optimizing method that saves time at the price of space. For example, a product of color component R(B) times the transparency alpha may be calculated beforehand, and stored in a 2D-array table; data in the 2D-array table are read directly each time color mixing is performed using the alpha color mixing method. It is assumed that the 2D-array table saves only a product of an RGB color component times the transparency alpha, such that resulting memory space occupation is small.

Based on that, the traditional alpha color mixing method may be improved as follows.

Step 1: pixel A is decomposed into RGB color components denoted by R(A), G(A), and B(A).

Step 2: pixel B is decomposed into RGB color components denoted by R(B), G(B), and B(B).

Step 3: a transparency alpha of pixel B is acquired, wherein the transparency falls in the range of an integer [0, 31], a pixel is completely transparent with alpha=0, and a pixel is completely opaque with alpha=31.

Step 4: as the sum of the transparencies of pixel A and pixel B is the maximal value of a transparency, the acquired transparency of pixel A is 31-alpha.

Step 5: a mixed pixel C is formed by a mixture of pixel B and pixel A, and RGB color components of the mixed pixel C, denoted by R(C), G(C), and B(C), are calculated respectively.

RGB color component R(C) of the mixed pixel C equals the sum of the product of color component R(B) of pixel B times the transparency alpha, and the product of color component R(A) of pixel A times the transparency 31-alpha, wherein values of both products are read from the 2D-array table directly.

RGB color component G(C) of the mixed pixel C equals the sum of the product of color component G(B) of pixel B times the transparency alpha, and the product of color component G(A) of pixel A times the transparency 31-alpha, wherein values of both products are read from the 2D-array table directly.

RGB color components B(C) of the mixed pixel C equals the sum of the product of color component B(B) of pixel B times the transparency alpha, and the product of color component B(A) of pixel A times the transparency 31-alpha, wherein values of both products are read from the 2D-array table directly.

Step 9: color components R(C), G(C), and B(C) of the mixed pixel C are synthesized into the final mixed pixel C.

With both technical solutions, to-be-mixed pixels are to be decomposed respectively into RGB color components, and then calculation is performed until a mixed pixel C is obtained finally. Wherein, with the fixed-point-number method, six integer multiplications have to be performed, thereby with a relatively long operating time; with the method by looking up a table, six integer multiplications are no longer required due to use of a 2D-array table, however it is required to traverse the 2D-array table to extracted data from the 2D-array table, which is time-consuming too, and what's more, more memory space is required for the 2D-array table. For example, for 16-bit RGB565 pixels, the range of levels of the alpha is taken as [0, 31], a 256*32 2D-array table is required, and memory occupation reaches 16 KB.

SUMMARY

It is desired that embodiments of the present disclosure provide a transparency-based image processing method, device, and terminal with which, when performing alpha color mixing, mixing calculation is performed directly on to-be-mixed pixels, without the need to decompose the to-be-mixed pixels into RGB color components before mixing calculation can be performed on each color component, thereby enhancing an efficiency of alpha color mixing of target pixels to a certain extent.

To this end, the present disclosure adopts a technical solution as follows.

A transparency-based image processing method includes steps of:

acquiring first simulated pixel information representing a first pixel, and acquiring first transparency information;

acquiring second simulated pixel information representing a second pixel, and acquiring second transparency information;

calculating third simulated pixel information representing a third pixel as a sum of a product of the first simulated pixel information times the first transparency information and a product of the second simulated pixel information times the second transparency information; and acquiring a third actual pixel by narrowing the third simulated pixel information.

The method may further include steps of: before executing any of the steps, acquiring the first simulated pixel information by simulating the first pixel; and acquiring the second simulated pixel information by simulating the second pixel.

According to an embodiment, a number of bits of the first simulated pixel information is set as twice a number of bits of the first pixel, and a number of bits of the second simulated pixel information is set as twice a number of bits of the second pixel.

According to an embodiment, the number of bits of the first simulated pixel information or the number of bits of the second simulated pixel information equals n+3×transparency when the number of bits of the first pixel or the number of bits of the second pixel equals n, wherein the n is a positive integer; and when $2^m < n+3 \times \text{transparency} < 2^{m+1}$, n+3×transparency is made to equal $2^{m+1}$, wherein the m is a positive integer.

According to an embodiment, when the number of bits of the first pixel or the number of bits of the second pixel is 16, and transparency=5, the number of bits of the first simulated pixel information or the number of bits of the second simulated pixel information is 32, and the step of acquiring the first simulated pixel information by simulating the first pixel or acquiring the second simulated pixel information by simulating the second pixel includes:

acquiring a color component R(A) of the first pixel or the second pixel by performing bit-by-bit AND of 0x1F and a value obtained by moving the first pixel or the second pixel to the right by 11 bits; acquiring a color component G(A) of the first pixel or the second pixel by performing bit-by-bit AND of 0x3F and a value obtained by moving the first pixel or the second pixel to the right by 5 bits; and acquiring a color component B(A) of the first pixel or the second pixel by performing bit-by-bit AND of 0x1F and the first pixel or the second pixel; and acquiring the first simulated pixel information or the second simulated pixel information by performing bit-by-bit OR of a value obtained by moving the color component R(A) to the left by 21 bits, a value obtained by moving the color component G(A) to the left by 10 bits, and the color component B(A).

According to an embodiment, the step of acquiring a third actual pixel by narrowing the third simulated pixel information may include:

acquiring an R color component R(SC) of the third simulated pixel information by performing bit-by-bit AND of 0x1F and a value obtained by moving the third simulated pixel information to the right by 26 bits;

acquiring a G color component G(SC) of the third simulated pixel information by performing bit-by-bit AND of 0x3F and a value obtained by moving the third simulated pixel information to the right by 15 bits;

acquiring a B color component B(SC) of the third simulated pixel information by performing bit-by-bit AND of 0x1F and a value obtained by moving the third simulated pixel information to the right by 5 bits; and acquiring the third actual pixel by performing bit-by-bit OR of a value obtained by moving the R color component R(SC) to the left by 11 bits, a value obtained by moving the G color component G(SC) to the left by 5 bits, and the B color component B(SC).

A transparency-based image processing device includes:

a first pixel processing unit configured to acquire first simulated pixel information representing a first pixel, and acquire first transparency information;

a second pixel processing unit configured to acquire second simulated pixel information representing a second pixel, and acquire second transparency information;

a central processing unit configured to calculate third simulated pixel information representing a third pixel as a sum of a product of the first simulated pixel information times the first transparency information and a product of the second simulated pixel information times the second transparency information; and a third pixel processing unit configured to acquire a third actual pixel by narrowing the third simulated pixel information.

According to an embodiment, the first pixel processing unit is further configured to acquire the first simulated pixel information by simulating the first pixel; the second pixel processing unit is further configured to acquire the second simulated pixel information by simulating the second pixel.

According to an embodiment, a number of bits of the first simulated pixel information is set as twice a number of bits of the first pixel, and a number of bits of the second simulated pixel information is set as twice a number of bits of the second pixel.

According to an embodiment, the number of bits of the first simulated pixel information or the number of bits of the second simulated pixel information equals n+3×transparency when the number of bits of the first pixel or the number of bits of the second pixel equals n, wherein the n is a positive integer; and when $2^m < n+3 \times \text{transparency} < 2^{m+1}$, n+3×transparency is made to equal $2^{m+1}$, wherein the m is a positive integer.

According to an embodiment, when the number of bits of the first pixel or the number of bits of the second pixel is 16, and transparency=5, the number of bits of the first simulated pixel information or the number of bits of the second simulated pixel information is 32, and the first simulated pixel information or the second simulated pixel information is acquired by acquiring a color component R(A) of the first pixel or the second pixel by performing bit-by-bit AND of 0x1F and a value obtained by moving the first pixel or the second pixel to the right by 11 bits; acquiring a color component G(A) of the first pixel or the second pixel by performing bit-by-bit AND of 0x3F and a value obtained by moving the first pixel or the second pixel to the right by 5 bits; and acquiring a color component B(A) of the first pixel or the second pixel by performing bit-by-bit AND of 0x1F and the first pixel or the second pixel; and acquiring the first simulated pixel information or the second simulated pixel information by performing bit-by-bit OR of a value obtained by moving the color component R(A) to the left by 21 bits, a value obtained by moving the color component G(A) to the left by 10 bits, and the color component B(A).

According to an embodiment, the third pixel processing unit narrows the third simulated pixel information by acquiring an R color component R(SC) of the third simulated pixel information by performing bit-by-bit AND of 0x1F and a value obtained by moving the third simulated pixel information to the right by 26 bits;

acquiring a G color component G(SC) of the third simulated pixel information by performing bit-by-bit AND of 0x3F and a value obtained by moving the third simulated pixel information to the right by 15 bits;

acquiring a B color component B(SC) of the third simulated pixel information by performing bit-by-bit AND of 0x1F and a value obtained by moving the third simulated pixel information to the right by 5 bits; and acquiring the third actual pixel by performing bit-by-bit OR of a value obtained by moving the R color component R(SC) to the left by 11 bits, a value obtained by moving the G color component G(SC) to the left by 5 bits, and the B color component B(SC).

A User Equipment includes a transparency-based image processing device as aforementioned, the device including:

a first pixel processing unit configured to acquire first simulated pixel information representing a first pixel, and acquire first transparency information;

a second pixel processing unit configured to acquire second simulated pixel information representing a second pixel, and acquire second transparency information;

a central processing unit configured to calculate third simulated pixel information representing a third pixel as a sum of a product of the first simulated pixel information times the first transparency information and a product of the second simulated pixel information times the second transparency information; and a third pixel processing unit configured to acquire a third actual pixel by narrowing the third simulated pixel information.

It can be seen from an aforementioned technical solution of the present disclosure that compared with an existing fixed-point-number method, the transparency-based image processing method provided by the present disclosure reduces prior six integer multiplications and three integer additions to two integer multiplications and one integer addition, such that efficiency in operating the method may be enhanced; compared with an existing method by looking up a table, the transparency-based image processing method provided by the present disclosure does not require traversing any 2D-array table or occupying any more memory.

BRIEF DESCRIPTION OF THE DRAWINGS

Drawings described here are used to provide further understanding of the present disclosure, constitute part of the present disclosure; an illustrative embodiment of the present disclosure and description therefor are used to explain the present disclosure, and do not constitute improper limitation of the present disclosure.

DETAILED DESCRIPTION

To clarify a technical problem to be solved by, a technical solution and beneficial effect of, the present disclosure, the present disclosure is further elaborated below with reference to drawings and embodiments. it should be understood that a specific embodiment illustrated here is merely for explaining the present disclosure, and shall not be used to limit the present disclosure.

Figure 1:
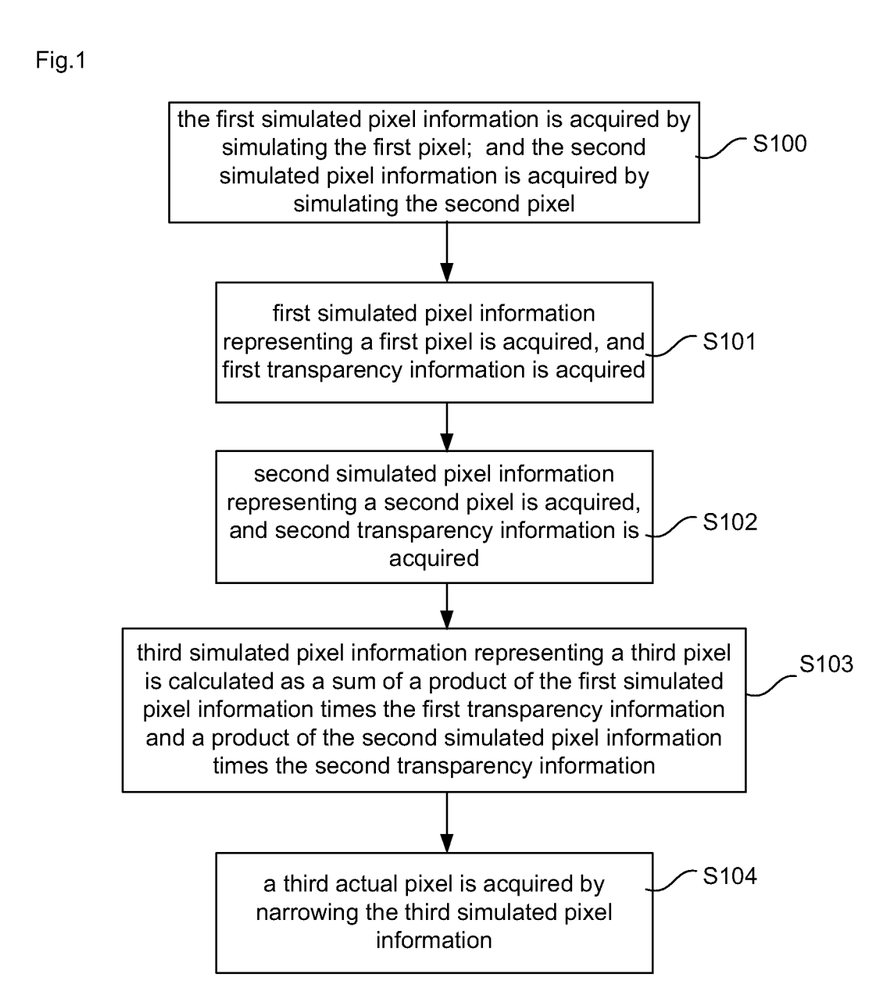
FIG. 1 is a flowchart of a transparency-based image processing method according to an embodiment of the present disclosure.

The present disclosure provides a transparency-based image processing method suitable for alpha color mixing with various pixel formats. As shown in FIG. 1, the method includes steps as follows.

S101. first simulated pixel information representing a first pixel is acquired, and first transparency information is acquired.

S102. second simulated pixel information representing a second pixel is acquired, and second transparency information is acquired.

S103. third simulated pixel information representing a third pixel is calculated as a sum of a product of the first simulated pixel information times the first transparency information and a product of the second simulated pixel information times the second transparency information.

S104. a third actual pixel is acquired by narrowing the third simulated pixel information.

Continuing with FIG. 1, in the embodiment, before executing any of the steps, the method may further include the following step.

S100. the first simulated pixel information is acquired by simulating the first pixel; and the second simulated pixel information is acquired by simulating the second pixel.

In an implementation of the embodiment, a number of bits of the first simulated pixel information is set as twice a number of bits of the first pixel, and a number of bits of the second simulated pixel information is set as twice a number of bits of the second pixel.

the number of bits of the first simulated pixel information or the number of bits of the second simulated pixel information equals n+3×transparency when the number of bits of the first pixel or the number of bits of the second pixel equals n, wherein the n is a positive integer. To benefit computer processing performance, it is best that a number of bits of a simulated pixel is a power of 2; therefore when $2^m < n+3\times transparency < 2^{m+1}$, n+3×transparency is made to equal $2^{m+1}$, wherein the m is a positive integer.

Taking a 16-bit RGB565 pixel format as an example, when the number of bits of the first pixel is 16, and transparency=5, the number of bits of the first simulated pixel information is 32, and the first simulated pixel information is acquired by simulating the first pixel by acquiring a color component R(A) of the first pixel by performing bit-by-bit AND of 0x1F and a value obtained by moving the first pixel to the right by 11 bits; acquiring a color component G(A) of the first pixel by performing bit-by-bit AND of 0x3F and a value obtained by moving the first pixel to the right by 5 bits; and acquiring a color component B(A) of the first pixel by performing bit-by-bit AND of 0x1F and the first pixel; and acquiring the first simulated pixel information by performing bit-by-bit OR of a value obtained by moving the color component R(A) to the left by 21 bits, a value obtained by moving the color component G(A) to the left by 10 bits, and the color component B(A).

Likewise, the number of bits of the second pixel is 16, the number of bits of the second simulated pixel information is 32, and the second simulated pixel information is acquired by simulating the second pixel by acquiring a color component R(A) of the second pixel by performing bit-by-bit AND of 0x1F and a value obtained by moving the second pixel to the right by 11 bits; acquiring a color component G(A) of the second pixel by performing bit-by-bit AND of 0x3F and a value obtained by moving the second pixel to the right by 5 bits; and acquiring a color component B(A) of the second pixel by performing bit-by-bit AND of 0x1F and the second pixel; and acquiring the second simulated pixel information by performing bit-by-bit OR of a value obtained by moving the color component R(A) to the left by 21 bits, a value obtained by moving the color component G(A) to the left by 10 bits, and the color component B(A).

In an implementation of the embodiment, in step S104 of the method, acquiring the third actual pixel by narrowing the third simulated pixel information includes the following steps:

S1041. an R color component R(SC) of the third simulated pixel information is acquired by performing bit-by-bit AND of 0x1F and a value obtained by moving the third simulated pixel information to the right by 26 bits;

S1041. a G color component G(SC) of the third simulated pixel information is acquired by performing bit-by-bit AND of 0x3F and a value obtained by moving the third simulated pixel information to the right by 15 bits;

S1041. a B color component B(SC) of the third simulated pixel information is acquired by performing bit-by-bit AND of 0x1F and a value obtained by moving the third simulated pixel information to the right by 5 bits; and S1041. the third actual pixel is acquired by performing bit-by-bit OR of a value obtained by moving the R color component R(SC) to the left by 11 bits, a value obtained by moving the G color component G(SC) to the left by 5 bits, and the B color component B(SC).

Figure 2:
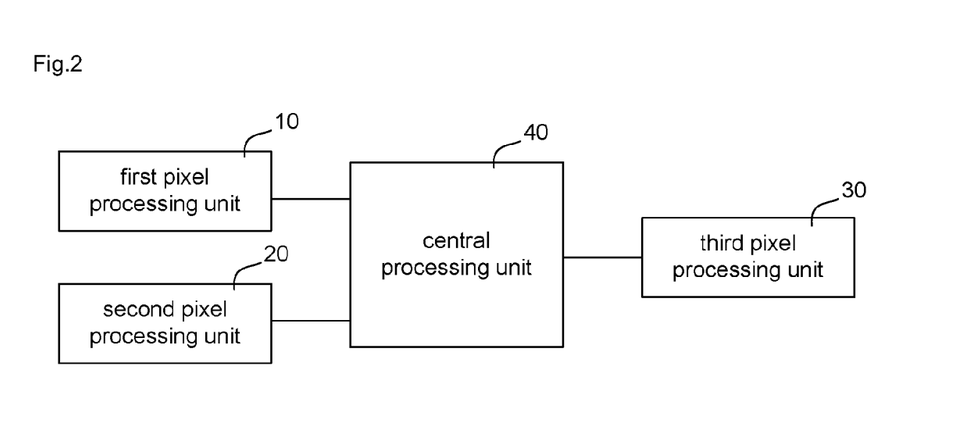
FIG. 2 is a schematic diagram of a structure of a transparency-based image processing device according to an embodiment of the present disclosure.

An embodiment of the present disclosure further provides a transparency-based image processing device, as shown in FIG. 2, including:

a first pixel processing unit 10 configured to acquire first simulated pixel information representing a first pixel, and acquire first transparency information;

a second pixel processing unit 20 configured to acquire second simulated pixel information representing a second pixel, and acquire second transparency information;

a central processing unit 40 configured to calculate third simulated pixel information representing a third pixel as a sum of a product of the first simulated pixel information times the first transparency information and a product of the second simulated pixel information times the second transparency information; and a third pixel processing unit 30 configured to acquire a third actual pixel by narrowing the third simulated pixel information.

In an implementation, the first pixel processing unit 10 is further configured to acquire the first simulated pixel information by simulating the first pixel; the second pixel processing unit 20 is further configured to acquire the second simulated pixel information by simulating the second pixel.

In an implementation of the embodiment, a number of bits of the first simulated pixel information is set as twice a number of bits of the first pixel, and a number of bits of the second simulated pixel information is set as twice a number of bits of the second pixel.

For example, when the number of bits of the first pixel is 16, the number of bits of the first simulated pixel information is 32, and the first simulated pixel information is acquired by simulating the first pixel by acquiring a color component R(A) of the first pixel by performing bit-by-bit AND of 0x1F and a value obtained by moving the first pixel to the right by 11 bits; acquiring a color component G(A) of the first pixel by performing bit-by-bit AND of 0x3F and a value obtained by moving the first pixel to the right by 5 bits; and acquiring a color component B(A) of the first pixel by performing bit-by-bit AND of 0x1F and the first pixel; and acquiring the first simulated pixel information by performing bit-by-bit OR of a value obtained by moving the color component R(A) to the left by 21 bits, a value obtained by moving the color component G(A) to the left by 10 bits, and the color component B(A).

When the number of bits of the second pixel is 16, the number of bits of the second simulated pixel information is 32, and the second simulated pixel information is acquired by simulating the second pixel by acquiring a color component R(A) of the second pixel by performing bit-by-bit AND of 0x1F and a value obtained by moving the second pixel to the right by 11 bits; acquiring a color component G(A) of the second pixel by performing bit-by-bit AND of 0x3F and a value obtained by moving the second pixel to the right by 5 bits; and acquiring a color component B(A) of the second pixel by performing bit-by-bit AND of 0x1F and the second pixel; and acquiring the second simulated pixel information by performing bit-by-bit OR of a value obtained by moving the color component R(A) to the left by 21 bits, a value obtained by moving the color component G(A) to the left by 10 bits, and the color component B(A).

In an implementation of the embodiment, the third pixel processing unit narrows the third simulated pixel information by acquiring an R color component R(SC) of the third simulated pixel information by performing bit-by-bit AND of 0x1F and a value obtained by moving the third simulated pixel information to the right by 26 bits;

acquiring a G color component G(SC) of the third simulated pixel information by performing bit-by-bit AND of 0x3F and a value obtained by moving the third simulated pixel information to the right by 15 bits;

acquiring a B color component B(SC) of the third simulated pixel information by performing bit-by-bit AND of 0x1F and a value obtained by moving the third simulated pixel information to the right by 5 bits; and acquiring the third actual pixel by performing bit-by-bit OR of a value obtained by moving the R color component R(SC) to the left by 11 bits, a value obtained by moving the G color component G(SC) to the left by 5 bits, and the B color component B(SC).

a transparency-based image processing method disclosed by the present disclosure is elaborated below with an example in which a first pixel and a second pixel are a 16-bit RGB565 pixel respectively.

Figure 3:
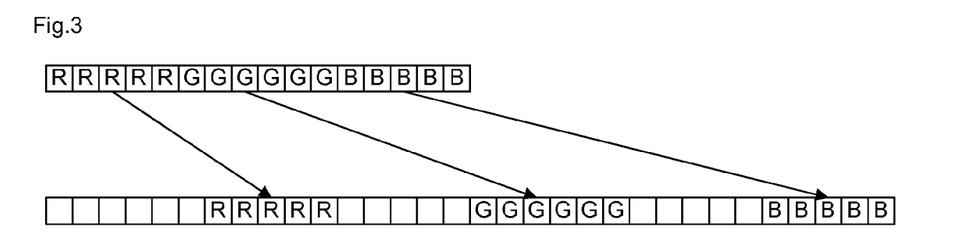
FIG. 3 is a schematic diagram of simulating a pixel according to an embodiment of the present disclosure.

Step 1: a first pixel (referred to as pixel A hereon) and a second pixel (referred to as pixel B hereon) to be mixed are simulated into a first simulated pixel (referred to as SA hereon), wherein the simulating method is a method by extension, that is, a simulated pixel SA is acquired by extending aforementioned pixel A and pixel B respectively, wherein the simulated pixel SA is of a 32-bit-pixel structure wherein a 32-bit integer is used for saving a value of a 16-bit RGB565 pixel. As shown in FIG. 3, three RGB color components are represented respectively by R, G, B, a Null character 0 is represented by blank.

Extension of pixel A and pixel B into simulated pixels SA and SB may be implemented by a bit operation. For example, a method for extending pixel A is as follows.

Three color components of a 16-bit RGB565 pixel A are denoted respective by R(A), G(A), and B(A). R(A) is obtained by performing bit-by-bit AND of 0x1F and a value obtained by moving pixel A to the right by 11 bits. G(A) is obtained by performing bit-by-bit AND of 0x3F and a value obtained by moving pixel A to the right by 5 bits. B(A) is obtained by performing bit-by-bit AND of 0x1F and pixel A. The three color components are merged into a simulated pixel SA by performing bit-by-bit OR of a value obtained by moving R(A) to the left by 21 bits, a value obtained by moving G(A) to the left by 10 bits, and B(A).

Likewise, an extended pixel SB of pixel B may be obtained using the aforementioned method.

Figure 4:
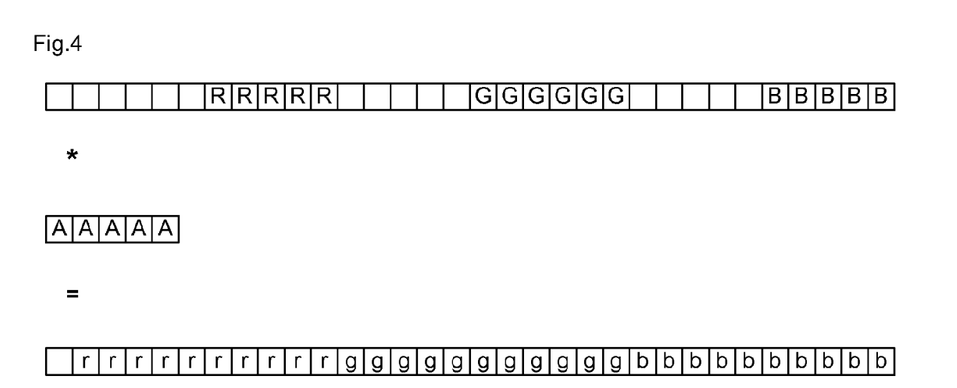
FIG. 4 is a schematic diagram of performing mixing calculation on simulated pixel information according to an embodiment of the present disclosure.

Step 2: mixing calculation is performed directly on the two obtained simulated pixels SA and SB.

As the range of levels of the transparency alpha is taken as [0, 31], the transparency is saved as a 5-bit integer, and a result of the mixing calculation may be saved directly as a 32-bit integer. As shown in FIG. 4, a value of transparency alpha is presented by A.

For a 16-bit RGB565 pixel A, a product of integer multiplication of a red component R(A) (which occupies 5 bits of an integer) by transparency alpha (which occupies 5 bits of an integer) may be saved using a 10-bit integer without data overflow. The same applies to the remaining color components.

Figure 5:
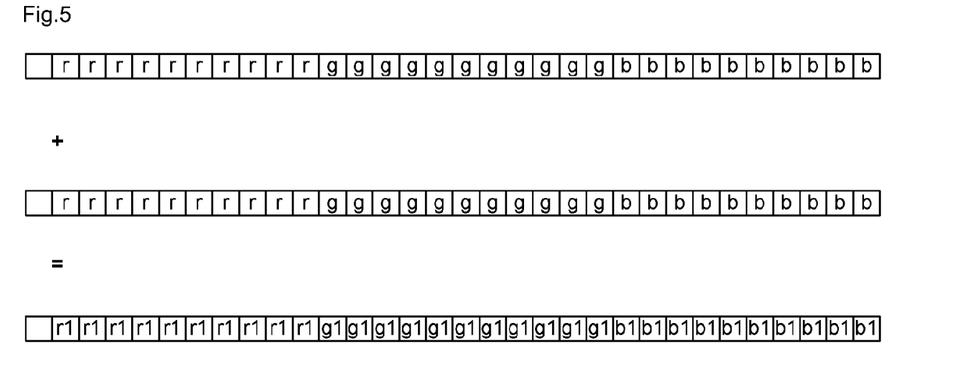
FIG. 5 is a schematic diagram of acquiring a third simulated pixel information according to an embodiment of the present disclosure.

Step 3: as shown in FIG. 5, the two mixed simulated pixels SA and SB are mixed by being added together.

According to FIG. 5, assume that each RGB color components saved in simulated pixels SB, SA takes a maximal value, as both SB, SA are multiplied by respective transparencies alpha, (31-alpha), the sum of the two resulting products will not exceed 31, that is, will not exceed a 5-bit integer. Therefore, the sum of the two mixed simulated pixels SB, SA may be save as a 31-bit integer without data overflow.

In FIG. 5, color components of the simulated pixels SB, SA are represented respectively by r, g, b, and color components of the mixed simulated pixel SC are represented respectively by r1, g1, b1.

Figure 6:
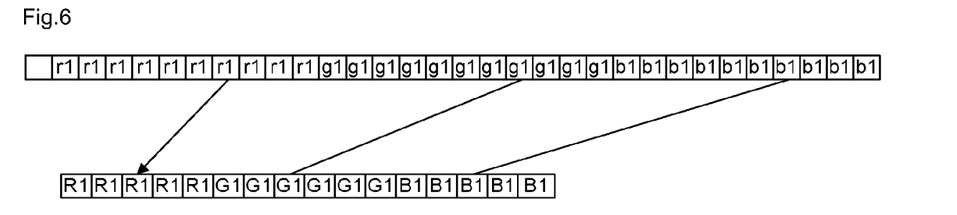
FIG. 6 is a schematic diagram of narrowing the third simulated pixel information according to an embodiment of the present disclosure.

Step 4: as shown in FIG. 6, a final pixel after alpha color mixing is acquired by narrowing the added simulated pixel SC to one with the original pixel format, that is, a 16-bit RGB565 pixel. Wherein in FIG. 6, color components of the final pixel after mixing are R1, G1, B1.

The step may be done with a bit operation. three color components of the 32-bit simulated pixel SC are denoted respectively by R(SC), G(SC), B(SC). R(SC) is obtained by performing bit-by-bit AND of 0x1F and a value obtained by moving the simulated pixel SC to the right by 26 bits. G(SC) is obtained by performing bit-by-bit AND of 0x3F and a value obtained by moving the simulated pixel SC to the right by 15 bits. B(SC) is obtained by performing bit-by-bit AND of 0x1F and a value obtained by moving the simulated pixel SC to the right by 5 bits. The three color components are merged into a 16-bit RGB565 pixel C by performing bit-by-bit OR of a value obtained by moving R(SC) to the left by 11 bits, a value obtained by moving G(SC) to the left by 5 bits, and B(SC).

The present disclosure may be used for implementing special effect of 3D translucent reflection. While ensuring quality of the original visual effect, performance of a transparency-based image processing method is enhanced without requiring any more memory occupation.

The present disclosure is suitable for alpha color mixing for various pixel formats, the number of bits of a simulated pixel is taken as twice of that of an original pixel, such that a simulated pixel may save a product of original pixel information by transparency information thereof. For example, a 32-bit RGBA8888 pixel may be extended to a 64-bit simulated pixel.

A following table is a table comparing performance with the present disclosure (method by extension, for short) and performance with the two existing technical solutions (namely, the fixed-point-number method and the method by looking up a table). Wherein, a 16-bit RGB565 pixel is used. Each method is operated a million times on a computer, 12 samplings are performed, the highest and the lowest sampled values are thrown away, and then the remaining 10 samplings are averaged. A relative time for performance-comparing data is taken to clearly show a proportional relation in performance.

|  | relatively time | occupied memory |
| --- | --- | --- |
| fixed-point-number method | 1 | none |
| method by looking up a table | 0.6 | 16 KB |
| method by extension | 0.52 | none |

It can be seen from the table that the method by extension according to the present disclosure is nearly twice as fast as the fixed-point-number method; and is slightly faster than the method by looking up a table without requiring 16 KB memory occupation.

As the present disclosure calculates by extending a low-bit pixel to a high-bit simulated pixel, no loss of precision in the original low-bit pixel will be caused. The present disclosure is advantageous in terms of performance and memory occupation, enhancing performance of a transparency-based image processing method without requiring any more memory occupation while ensuring high-quality visual effect.

An embodiment of the present disclosure further provides a UE including an aforementioned transparency-based image processing device, the device including:

a first pixel processing unit configured to acquire first simulated pixel information representing a first pixel, and acquire first transparency information;

a second pixel processing unit configured to acquire second simulated pixel information representing a second pixel, and acquire second transparency information;

a central processing unit configured to calculate third simulated pixel information representing a third pixel as a sum of a product of the first simulated pixel information times the first transparency information and a product of the second simulated pixel information times the second transparency information; and a third pixel processing unit configured to acquire a third actual pixel by narrowing the third simulated pixel information.

Here, the UE may be an arbitrary UE that can process transparency information. For example, the UE may be a mobile phone, a portable computer, or the like. Refer to what described for the detailed description of the UE, which is not repeated here.

Although what described shows and illustrates an embodiment of the present disclosure, as aforementioned, it should be understood that the present disclosure is not limited to forms disclosed herein, which should not be construed as exclusion of other embodiments, but may be used for various other combinations, modifications and environments, and can be altered within the range conceived herein via aforementioned teaching or related art or knowledge. However, any alteration or variation made by those skilled in the art without departing from the spirit and scope of the present disclosure shall fall within the scope of the claims attached to the present disclosure.

The invention claimed is:

1. A transparency-based image processing method, comprising steps of:
   acquiring first simulated pixel information representing a first pixel, and acquiring first transparency information;
   acquiring second simulated pixel information representing a second pixel, and acquiring second transparency information;

calculating third simulated pixel information representing a third pixel as a sum of a product of the first simulated pixel information times the first transparency information and a product of the second simulated pixel information times the second transparency information; and acquiring a third actual pixel by narrowing the third simulated pixel information, wherein the number of bits of the first simulated pixel information or the number of bits of the second simulated pixel information equals n+3×transparency when the number of bits of the first pixel or the number of bits of the second pixel equals n, wherein the n is a positive integer; and when $2^m < n+3 \times \text{transparency} < 2^{m+1}$, n+3×transparency is made to equal $2^{m+1}$, wherein the m is a positive integer;

wherein when the number of bits of the first pixel or the number of bits of the second pixel is 16, and transparency=5, the number of bits of the first simulated pixel information or the number of bits of the second simulated pixel information is 32, and the step of acquiring the first simulated pixel information by simulating the first pixel or acquiring the second simulated pixel information by simulating the second pixel comprises:

acquiring a color component R(A) of the first pixel or the second pixel by performing bit-by-bit AND of 0x1F and a value obtained by moving the first pixel or the second pixel to the right by 11 bits; acquiring a color component G(A) of the first pixel or the second pixel by performing bit-by-bit AND of 0x3F and a value obtained by moving the first pixel or the second pixel to the right by 5 bits; and acquiring a color component B(A) of the first pixel or the second pixel by performing bit-by-bit AND of 0x1F and the first pixel or the second pixel; and acquiring the first simulated pixel information or the second simulated pixel information by performing bit-by-bit OR of a value obtained by moving the color component R(A) to the left by 21 bits, a value obtained by moving the color component G(A) to the left by 10 bits, and the color component B(A), wherein the step of acquiring a third actual pixel by narrowing the third simulated pixel information comprises:

acquiring an R color component R(SC) of the third simulated pixel information by performing bit-by-bit AND of 0x1F and a value obtained by moving the third simulated pixel information to the right by 26 bits;

acquiring a G color component G(SC) of the third simulated pixel information by performing bit-by-bit AND of 0x3F and a value obtained by moving the third simulated pixel information to the right by 15 bits;

acquiring a B color component B(SC) of the third simulated pixel information by, performing bit-by-bit AND of 0x1F and a value obtained by moving the third simulated pixel information to the right by 5 bits; and acquiring the third actual pixel by performing bit-by-bit OR of a value obtained by moving the R color component R(SC) to the left by 11 bits, a value obtained by moving the G color component G(SC) to the left by 5 bits, and the B color component B(SC).

2. The method according to claim 1, further comprising steps of: before executing any of the steps, acquiring the first simulated pixel information by simulating the first pixel; and acquiring the second simulated pixel information by simulating the second pixel.

3. The method according to claim 2, wherein a number of bits of the first simulated pixel information is set as twice a number of bits of the first pixel, and a number of bits of the second simulated pixel information is set as twice a number of bits of the second pixel.

4. A transparency-based image processing device, comprising:

a first pixel processor configured to acquire first simulated pixel information representing a first pixel, and acquire first transparency information;

a second pixel processor configured to acquire second simulated pixel information representing a second pixel, and acquire second transparency information;

a central processor configured to calculate third simulated pixel information representing a third pixel as a sum of a product of the first simulated pixel information times the first transparency information and a product of the second simulated pixel information times the second transparency information; and a third pixel processor configured to acquire a third actual pixel by narrowing the third simulated pixel information, wherein the number of bits of the first simulated pixel information or the number of bits of the second simulated pixel information equals n+3×transparency when the number of bits of the first pixel or the number of bits of the second pixel equals n, wherein the n is a positive integer; and when $2^m < n+3 \times \text{transparency} < 2^{m+1}$, n+3×transparency is made to equal $2^{m+1}$, wherein the m is a positive integer;

wherein when the number of bits of the first pixel or the number of bits of the second pixel is 16, and transparency=5, the number of bits of the first simulated pixel information or the number of bits of the second simulated pixel information is 32, and the step of acquiring the first simulated pixel information by simulating the first pixel or acquiring the second simulated pixel information by simulating the second pixel comprises:

acquiring a color component R(A) of the first pixel or the second pixel by performing bit-by-bit AND of 0x1F and a value obtained by moving the first pixel or the second pixel to the right by 11 bits; acquiring a color component G(A) of the first pixel or the second pixel by performing bit-by-bit AND of 0x3F and a value obtained by moving the first pixel or the second pixel to the right by 5 bits; and acquiring a color component B(A) of the first pixel or the second pixel by performing bit-by-bit AND of 0x1F and the first pixel or the second pixel; and acquiring the first simulated pixel information or the second simulated pixel information by performing bit-by-bit OR of a value obtained by moving the color component R(A) to the left by 21 bits, a value obtained by moving the color component G(A) to the left by 10 bits, and the color component B(A), wherein the step of acquiring a third actual pixel by narrowing the third simulated pixel information comprises:

acquiring an R color component R(SC) of the third simulated pixel information by performing bit-by-bit AND of 0x1F and a value obtained by moving the third simulated pixel information to the right by 26 bits;

acquiring a G color component G(SC) of the third simulated pixel information by performing bit-by-bit AND of 0x3F and a value obtained by moving the third simulated pixel information to the right by 15 bits;

acquiring a B color component B(SC) of the third simulated pixel information by performing bit-by-bit AND of 0x1F and a value obtained by moving the third simulated pixel information to the right by 5 bits; and acquiring the third actual pixel by performing bit-by-bit OR of a value obtained by moving the R color component R(SC) to the left by 11 bits, a value obtained by moving the G color component G(SC) to the left by 5 bits, and the B color component B(SC).

5. The device according to claim 4, wherein the first pixel processing unit is further configured to acquire the first simulated pixel information by simulating the first pixel; the second pixel processing unit is further configured to acquire the second simulated pixel information by simulating the second pixel.

6. The device according to claim 5, wherein a number of bits of the first simulated pixel information is set as twice a number of bits of the first pixel, and a number of bits of the second simulated pixel information is set as twice a number of bits of the second pixel.

7. A User Equipment, comprising a device according to claim 4.

8. A User Equipment, comprising a device according to claim 5.

9. A User Equipment, comprising a device according to claim 6.

* * * * *